US012792942B2

(12) United States Patent
Ushijima et al.

(10) Patent No.: US 12,792,942 B2
(45) Date of Patent: Nov. 10, 2026

(54) QUANTUM BIT ROUTING

(71) Applicant: Fujitsu Limited, Kawasaki (JP)

(72) Inventors: Hayato Ushijima, Dublin, CA (US); Xiaoyuan Liu, Santa Clara, CA (US)

(73) Assignee: Fujitsu Limited, Kawasaki (JP)

( * ) Notice: Subject to any disclaimer, the term of this patent is extended or adjusted under 35 U.S.C. 154(b) by 782 days.

(21) Appl. No.: 18/348,248

(22) Filed: Jul. 6, 2023

(65) Prior Publication Data

US 2025/0036986 A1 Jan. 30, 2025

(51) Int. Cl.
*G06N 10/20* (2022.01)

(52) U.S. Cl.
CPC .................................... *G06N 10/20* (2022.01)

(58) Field of Classification Search
CPC ........... G06N 10/20; G06N 5/01; G06N 10/00
See application file for complete search history.

(56) References Cited

U.S. PATENT DOCUMENTS

2020/0242295 A1* 7/2020 Martiel ................. G06F 30/392
2022/0179737 A1* 6/2022 Jones .................. G06F 11/1048
2026/0099749 A1* 4/2026 Simmons ............... G06N 10/40

* cited by examiner

*Primary Examiner* — Jack Chiang
*Assistant Examiner* — Brandon Bowers
(74) *Attorney, Agent, or Firm* — Maschoff Brennan

(57) ABSTRACT

A method may include obtaining a graph in which a first and a second node respectively represent a first and a second qubit. The method may include generating candidate paths between the first and second nodes along one or more edges, each candidate path specifying a path that arrives at a target edge between the first and second nodes. The method may include computing scores for a plurality of path pairs, a respective score indicating how efficiently a respective path pair routes the first node to the second node via the target edge. The score may be weighted based on an order in which operations of the quantum circuit are performed with earlier operations being weighted more heavily than later operations. The method may include selecting the path pair that corresponds to a highest score for routing the first node to the second node via the target edge.

18 Claims, 12 Drawing Sheets

QUANTUM BIT ROUTING

BACKGROUND

Quantum computers may use quantum bits ("qubits") capable of representing information as ones, zeroes, or ones and zeroes simultaneously. Quantum computers may perform some types of computations, such as optimization problems, integer factorization, simulation modeling, and/or data analysis, more efficiently and/or more accurately than classical computing systems. However, existing quantum computers may be classified as noisy intermediate-scale quantum (NISQ) devices because the existing quantum computers only include a limited numbers of qubits and are consequently unable or unsuitable to perform some computationally demanding tasks.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include obtaining a graph in which a first and a second node respectively represent a first and a second qubit. The method may include generating candidate paths between the first and second nodes along one or more edges, each candidate path specifying a path that arrives at a target edge between the first and second nodes. The method may include computing scores for a plurality of path pairs, a respective score indicating how efficiently a respective path pair routes the first node to the second node via the target edge. The score may be weighted based on an order in which operations of the quantum circuit are performed with earlier operations being weighted more heavily than later operations. The method may include selecting the path pair that corresponds to a highest score for routing the first node to the second node via the target edge.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

Figure 1:
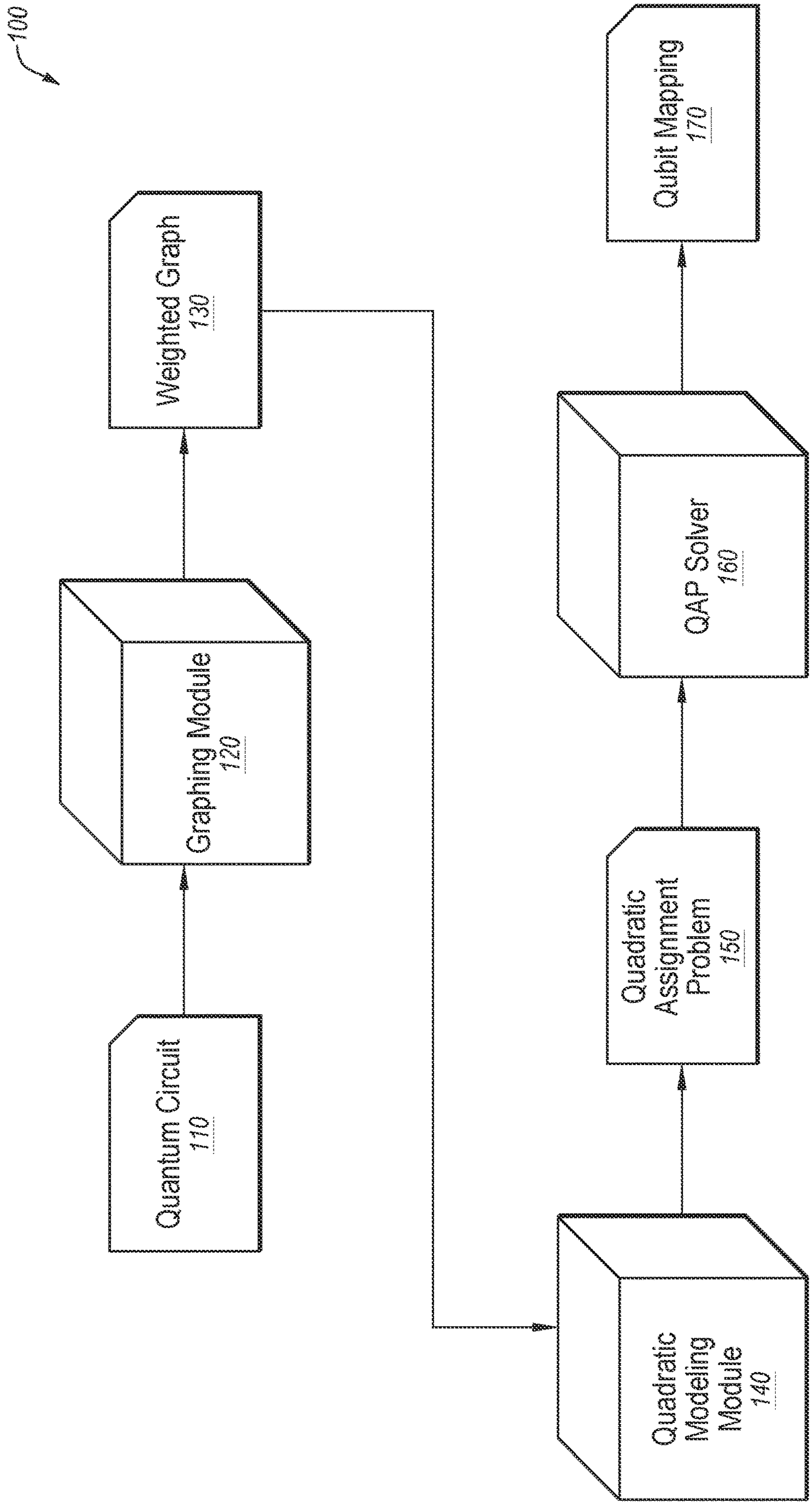
FIG. 1 is a diagram of an example operating environment in which an initial qubit mapping may be determined according to one or more embodiments of the present disclosure.

Quantum computers use quantum bits, or "qubits," that are configured to store values of 0, 1, or a superposition of both 0 and 1. Because qubits are capable of simultaneously storing multiple values, quantum computers are capable of performing calculations more quickly than classical computers that use classical bits storing values of either 0 or 1. Consequently, quantum computers may more efficiently perform computations, such as for optimization problems, and improve computations in various technology fields, such as physics, chemistry, material design, drug discovery, and machine learning.

However, existing quantum computers are physically constrained with respect to the number of qubits that may be included in a particular quantum computing system. The existing quantum computers are referred to as Noisy Intermediate Scale Quantum (NISQ) devices because the computational performance of such NISQ devices is constrained by current physical and technological limitations of quantum computers. The NISQ devices' sensitivity to external interference and reliability problems typically are caused by the quantum hardware's susceptibility to error caused by noise that disrupts operations of the quantum computers due to stray electromagnetic radiation, material defects, or other external obstructions. Furthermore, qubits exhibit quantum characteristics for a limited period of time, and computations performed by NISQ devices involve measuring values associated with the qubits during the period of time in which the qubits exhibit quantum characteristics.

The noise interference and error tolerance of a particular NISQ device depends in part on the locations of qubits associated with the particular NISQ devices. Existing NISQ computer chips may involve quantum circuits including tens or hundreds of qubits having a sparse structure such that each qubit included in the quantum circuit may not be directly connected with each other qubit of the quantum circuit. As a result, qubits included in a quantum circuit may not necessarily be configured to directly communicate with each other qubit. Exchange of information between two disconnected qubits may be facilitated by using one or more swap gate operations to reposition one or both disconnected qubits until the two disconnected qubits are directly connected to one another according to the sparse structure of the quantum circuit.

However, each swap gate operation introduces additional noise to the operation of the NISQ device and increases the likelihood of erroneous computations. How the qubits in a particular quantum circuit are arranged or mapped may facilitate making direct connections between qubits that are likely to communicate with one another for particular computational operations and decrease the noise experienced by the NISQ device during operation. As the number of operations performed by the NISQ device increases, it may be desirable for the number of direct connections between the qubits performing the operations to increase so that the noise experienced by the NISQ device during performance of said operations decreases.

The present disclosure relates to, among other things, logically mapping qubits to increase the number of directly connected qubit pairs used in operations of a particular NISQ device and decrease the number of swap gates used to achieve direct connections between qubit pairs during operations of the particular NISQ device. Mapping the qubits according to one or more embodiments of the present disclosure may include modeling circuitry associated with a particular NISQ device as a weighted graph in which the nodes of the graph represent a qubit architecture of the particular NISQ device and the edges between the nodes represent direct connections between the qubits. The nodes may be weighted so that a particular node representing a qubit involved in earlier operations of the particular NISQ device are weighted more heavily, while a qubit involved in later operations of the particular NISQ device are given less weight. The weighted graph representing the particular NISQ device may be modeled as a Quadratic Assignment Problem (QAP) and solved to determine an initial mapping of the qubits that decreases the distance between pairs of qubits involved with operations of the particular NISQ device.

Weighing the graph edges representing the gates based on the order in which operations are performed by the particular NISQ device may result in improved qubit mapping relative to existing methods of determining qubit mapping positions. Existing methods of qubit mapping typically do not consider the entire sequence of operations being performed by the particular NISQ device and may determine inefficient qubit mappings based on only a first subset of operations performable by the qubits.

Additionally or alternatively, the present disclosure relates to, among other things, identifying one or more paths for routing qubits to increase the number of directly connected qubit pairs used in operations of a particular NISQ device and decrease the number of swap gates used to achieve direct connections between qubit pairs during operations of the particular NISQ device. Routing the qubits according to one or more embodiments of the present disclosure may include modeling circuitry associated with a particular NISQ device as a graph in which the nodes of the graph represent a qubit architecture of the particular NISQ device and the edges between the nodes represent direct connections between the qubits. Paths between any two particular qubits included in the particular NISQ device may be represented as a series of direct connections between the nodes that represent the two particular qubits. Candidate paths between the two nodes that represent the two particular qubits may be identified, and each of the candidate paths may be evaluated to determine a respective score associated with each of the candidate paths. The scoring of the candidate paths may relate to the operations that the qubits associated with the candidate paths are scheduled to perform. Candidate paths between qubits that are involved in performing earlier operations of the particular NISQ device may be weighted more heavily, while candidate paths between qubits involved in performing later operations may be given less weight. A candidate path may be selected based on the scores associated with each of the candidate paths.

Weighing the candidate paths based on the order in which operations are performed by the particular NISQ device may result in improved qubit routing relative to existing methods of qubit routing. Existing methods of qubit routing typically do not consider the entire sequence of operations being performed by the particular NISQ device and may determine inefficient qubit routings based on only a first subset of operations performable by the qubits.

Embodiments of the present disclosure are explained with reference to the accompanying figures.

FIG. 1 is a diagram of an example operating environment 100 in which an initial qubit mapping may be determined according to one or more embodiments of the present disclosure. The operating environment 100 may include a graphing module, a quadratic modeling module 140, and/or a Quadratic Assignment Problem solver 160 that are configured to obtain as input and/or output a quantum circuit 110, a weighted graph 130, a Quadratic Assignment Problem (QAP) 150, and/or a qubit mapping 170.

In some embodiments, the graphing module 120, the quadratic modeling module 140, and/or the QAP solver 160 (collectively referred to herein as "the computing modules") may include code and routines configured to enable a computing system to perform one or more operations. Additionally or alternatively, one or more of the computing modules may be implemented using hardware including a processor, a microprocessor (e.g., to perform or control performance of one or more operations), a field-programmable gate array (FPGA), or an application-specific integrated circuit (ASIC). In some other instances, the computing modules may be implemented using a combination of hardware and software. In the present disclosure, operations described as being performed by the computing modules may include operations that the computing modules may direct one or more corresponding systems to perform. The computing modules may be configured to perform a series of operations with respect to the quantum circuit 110, the weighted graphs 130, the QAP 150, and/or the qubit mapping 170 as described in further detail below and in relation to an example method 300, an example method 400, and/or an example method 500 as described with respect to FIGS. 3, 4, and/or 5, respectively.

The quantum circuit 110 may include quantum bits ("qubits") in which a particular qubit of the quantum circuit 110 may be connected to one or more other qubits of the quantum circuit 110 through quantum gates. The quantum circuit 110 may be a Noisy Intermediate Scale Quantum (NISQ) circuit that includes approximately forty qubits to approximately one thousand qubits. The qubits included in a NISQ circuit may be sparsely connected such that each qubit included in the NISQ circuit is not connected to each other qubit included in the NISQ circuit due to physical limitations of the NISQ circuit.

To perform a computation using the quantum circuit 110, a first qubit may be designated to communicate with a second qubit via a quantum gate that connects the first qubit to the second qubit. In some situations, the first qubit and the second qubit may or may not be directly connected to one another via a quantum gate because one or more additional qubits may be positioned between the first qubit and the second qubit. For example, a third qubit may be directly connected to the first qubit and the second qubit, but the first qubit and the second qubit may not be directly connected to each other. In these and other situations, the third qubit and either the first qubit or the second qubit may be swapped by implementing a swap gate between the third qubit and either the first qubit or the second qubit to logically exchange positioning of the two qubits affected by the swap gate. In other words, the third qubit may be logically designated to perform computations and/or operations originally designated to the second qubit during operation of the quantum circuit 110.

The graphing module 120 may be configured to obtain the quantum circuit 110 and output the weighted graph 130 to represent the quantum circuit 110. In some embodiments, the weighted graph 130 may be a graph that visually represents the quantum circuit 110. Additionally or alternatively, the weighted graph 130 may quantitatively represent the quantum circuit 110 using one or more matrices. The weighted graph 130 may include nodes that represent the qubits of the quantum circuit 110 and edges connecting one or more of the nodes to one another that represent the quantum gates connecting the qubits.

Figure 2A:
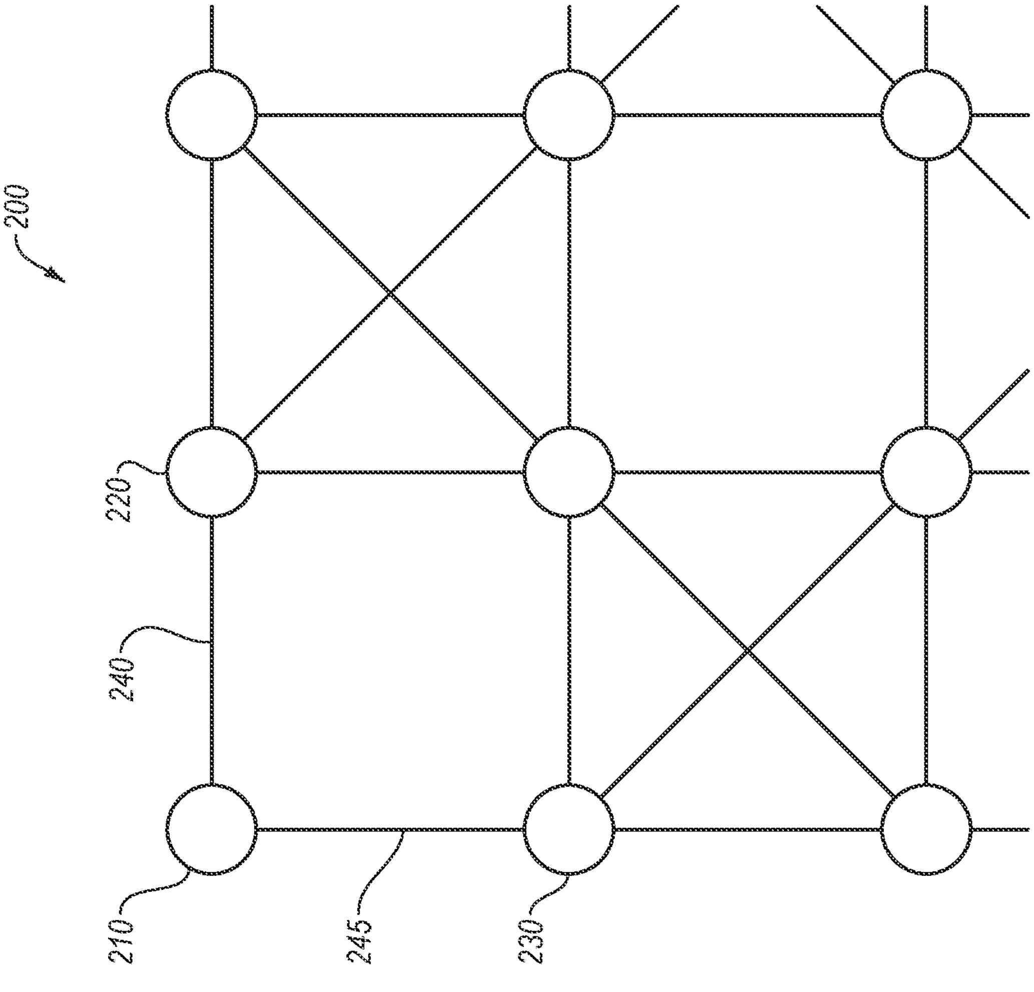
FIG. 2A illustrates a first example graph representing qubits of a quantum computing system.

For example, FIG. 2A illustrates a first example graph 200 of a quantum computing system. The first graph 200 includes nodes, such as a first node 210, a second node 220, and a third node 230, and edges, such as a first edge 240 and a second edge 245. As illustrated in FIG. 2A, the first node 210 is connected to the second node 220 by the first edge 240, and the first node 210 is connected to the third node 230 by the second edge 245. However, the second node 220 is not directly connected to the third node 230 because an edge does not exist between the second node 220 and the third node 230.

Figure 2B:
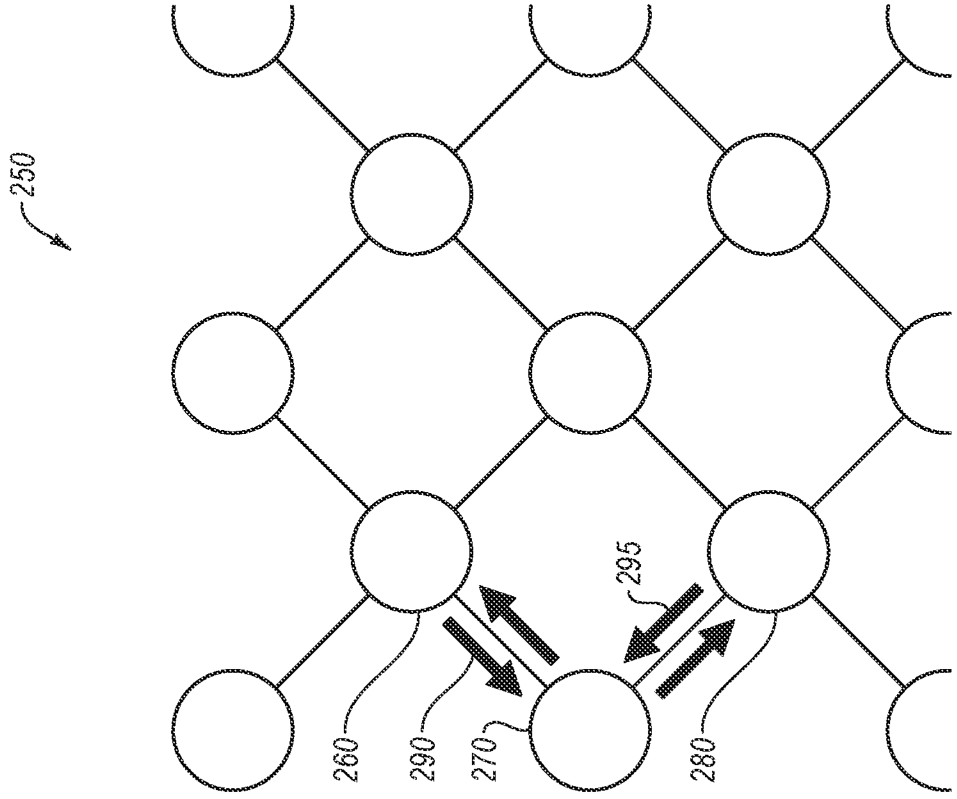
FIG. 2B illustrates a second example graph representing qubits of a quantum computing system.

As an additional or alternative example, FIG. 2B illustrates a second example graph 250 of a quantum computing system. The second graph 250 includes a first node 260 connected to a second node 270 via a first edge 290 and a third node 280 that connects to the second node via a second edge 295. FIG. 2B further illustrates that positions associated with logical qubits represented by the first node 260, the second node 270, and/or the third node 280 may be exchanged. For example, the first node 260 may be swapped with the second node 270 via the first edge 290 to facilitate direct connection between the first node 260 and the third node 280 via the second edge 295. As an additional or alternative example, the second node 270 may be swapped with the third node 280 via the second edge 295 to facilitate a direct connection between the same direct connection between the first node 260 and the third node 280. As illustrated in the second graph 250 and in these and other embodiments, the physical qubits corresponding to the first node 260, the second node 270, and the third node 280 are not being rearranged by a particular swap gate. Rather, operations logically associated with the qubits corresponding to the first node 260, the second node 270, and the third node 280 may be reassigned to another qubit by the particular swap gate.

Returning to the description of FIG. 1, representing the quantum circuit 110 as the weighted graph 130 may present the quantum circuit 110 in a quantitative form that is more readily and effectively analyzed to determine mappings of the qubits that facilitate more efficient operations of the quantum circuit 110. For a quantum circuit 110 that is configured to perform a particular series of operations, the qubits of the quantum circuit 110 that are involved in performing the particular series of operations may be known. In other words, which qubits are used and an order in which the qubits are used in operations of the quantum circuit 110 may be known. However, the logical configuration of the quantum circuit 110 (i.e., the initial mapping of the logical qubits) may or may not be readily apparent given the qubits assigned to particular operations and the order in which the operations are scheduled to be performed.

In some embodiments, the weighted graph 130 may be represented by one or more matrices that quantitatively describe the quantum circuit 110. For example, the graphing module 120 may generate a flow matrix that quantifies connections between the nodes of the weighted graph 130. Given a particular quantum circuit 110 that includes M two-qubit gates acting on Q qubits, the weighted graph 130 may be represented as a matrix set, $(V, E^c)$, in which the dimensions of V and $E^C$ are set based on the integers Q and M, respectively. A particular element, $v_i$, included in V may correspond to a respective qubit, $q_i$. A particular two-qubit gate, $g_u$, included in the set of $E^C$ may be represented in relation to the two qubits the particular two-qubit gate connects. For example, a two-qubit gate connecting a first qubit, $q_i$, and a second qubit, $q_j$, may be specified according to a coordinate $(q_i, q_j)$.

Additionally or alternatively, the graphing module 120 may generate a distance matrix that quantifies distances between the nodes of the weighted graph 130. For example, a piecewise function $r(q_i, q_j)$ may be defined to determine the distance between a first qubit, $q_i$, and a second qubit, $q_j$, in which the function computes a shortest distance between the first qubit and the second qubit in situations in which the first qubit and the second qubit are not the same qubit. In situations in which the first qubit and the second qubit are the same qubit, the function may return a value of zero. In other words, the function may be represented according to the following equation:

$$r(q_i, q_j) = \begin{cases} s(q_i, q_j) - 1, & \text{for } q_i \neq q_j \\ 0, & \text{for } q_i = q_j \end{cases} \quad (1)$$

in which $s(q_i, q_j)$ represents a function for determining a shortest distance between the first qubit and the second qubit measured according to a number of swap gate operations used to move the first qubit and the second qubit adjacent to one another.

Additionally or alternatively, the graphing module 120 may assign weight values to the edges of the weighted graph 130 to indicate an importance or lack of importance of a particular edge between a pair of qubits for determining an initial mapping of the qubits given a particular set of operations to be performed by the quantum circuit 110. Whether a particular edge between a pair of qubits is important for determining the initial mapping of the qubits may depend on a gate depth of the particular edge. The gate depth of a particular qubit gate, which may be represented by a respective edge of the graph, describes a sequence and/or a frequency that the two qubits associated with the particular qubit gate are involved in operations of the quantum circuit 110. For example, a particular quantum circuit 110 may involve performing one hundred operations with each operation involving two qubits. A first particular qubit involved in the first operation of the particular quantum circuit 110 may include a lower gate depth than a second particular qubit involved in the one-hundredth operation of the particular quantum circuit 110. The gate depth of a particular qubit may influence the initial mapping of qubits for the quantum circuit 110 because qubits involved with earlier operations of the quantum circuit 110 are likely to either also be involved in later operations of the quantum circuit 110 and/or be involved in swap gate operations relating to qubits that are involved in the later operations of the quantum circuit 110. Because swap gates are likely to be used to reposition qubits during operation of the quantum circuit 110, qubit mapping for earlier operations of the quantum circuit 110 may be given greater weight than qubit mapping for later operations of the quantum circuit 110.

In some embodiments, the gate depth may be described quantitatively in terms of spacetime coordinates, $(t_i, x_i)$, of a particular quantum gate, $g_i$. For example, the gate depth may involve a mapping, w, of the set involving the two-qubit gates, $E^c$, in which the gate depth for a particular element, $e_i$, is described by a temporal component, $t_i$, of the spacetime coordinate. Accordingly, the gate depth may be represented by the following relationship:

$$w(e_i) = t_i \tag{2}$$

The gate depth as represented by Equation (2) may indicate the sequential order in which qubits of the quantum circuit 110 are used in the operations of the quantum circuit 110. For example, two qubits associated with the first operation scheduled to be performed by the quantum circuit 110 may include a gate depth of one, while two qubits associated with a tenth operation scheduled to be performed by the quantum circuit 110 may include a gate depth of ten.

The quadratic modeling module 140 may be configured to model the inputted weighted graph 130 as a QAP 150. In some embodiments, the QAP 150 may represent an optimizable and quantitative description of the weighted graph 130. For example, a flow matrix and a distance matrix corresponding to the weighted graph 130 may be combined and represented by the following QAP 150:

$$\min \sum_{i}^{n} \sum_{j}^{n} f_{i,j} d_{\sigma(i),\sigma(j)} \tag{3}$$

in which $f_{i,j}$ represents the flow matrix and $d_{\sigma(i),\sigma(j)}$ represents the distance matrix. The Equation (3) may be a combination of the flow matrix and the distance matrix as an optimizable relationship, which may be representative of the positions and connections between the nodes of the quantum circuit 110. Whether pairs of nodes are configured to communicate with one another, as represented by the flow matrix, and how far pairs of nodes are from one another, as represented by the distance matrix, may be considered for each pair of nodes included in the quantum circuit 110 using the Equation (3).

Additionally or alternatively, a bias term may be introduced to the QAP 150 represented by Equation (3) to account for self-referential flows (i.e., a qubit that is connected to itself by a one-qubit gate) associated with one or more qubits included in the quantum circuit 110. With consideration for the bias term, the QAP 150 may be represented by the following relationship:

$$\min \sum_{i}^{n} \sum_{j}^{n} f_{i,j} d_{\sigma(i),\sigma(j)} + \sum_{i=1}^{n} b_{i,\sigma(i)} \tag{4}$$

in which $b_{i,\sigma(i)}$ represents a bias matrix.

The Equation (3) and the Equation (4) may represent graphs that correspond to unweighted quantum circuits and may not account for varying degrees of importance between different qubit gates, represented as edges between graph nodes, included in the unweighted quantum circuits. For example, an important qubit gate that is used in multiple operations, such as because the important qubit gate appears in an early scheduled operation of a quantum circuit and later scheduled operations of the quantum circuit, may be considered equal to another qubit gate that is not used in any operations of the quantum circuit. In some embodiments, the quadratic modeling module 140 may be configured to generate the QAP 150 with consideration for the gate depth of the quantum circuit 110 to represent variations in the importance of different qubit gates. For example, a depth-aware quadratic routing length may be represented by the following relationship:

$$\min \sum_{e=(u,v)\in E^C} \lambda^{w(e)} d_{\mu(u),\mu(v)} \tag{5}$$

In Equation (5), a gate depth, w(e), may be included with a weighting term, $\lambda^{w(e)}$, in which is greater than zero but less than one to denote that qubits having smaller gate depths contribute more to the value of the QAP 150. As the gate depth decreases for qubits being included in earlier operations of the quantum circuit 110, the weighting term also approaches a value of one. Thus, terms that include lower gate depth values may be given higher priority for minimizing the output of the QAP 150.

Additionally or alternatively, conventions associated with gate depths may be inverted such that earlier operations are assigned greater gate depths, while later operations are assigned lower gate depths. In these and other embodiments, the Equation (5) may be changed to an optimization problem that aims to maximize the outputted value of the equation rather than minimizing the outputted value as recited in the Equation (5).

Additionally or alternatively, the QAP 150 may be represented as a Quadratic Binary optimization Problem (QBP), which may be more readily solved by the QAP solver 160. A priority adjustment term, $\alpha_e$, that includes a constant value and/or a routing length minimization term, $x_{ij}$, may be introduced to the QAP 150 to derive the following relationship:

$$\min \sum_{i,j,k,l\in\{1,\ldots,n\}} \sum_{e\in E^C[i,j]} \alpha_e \lambda^{w(e)} d_{kl} x_{ik} x_{jl} \tag{6}$$

subject to the following conditions:

$$\sum_{i=1}^{n} x_{ij} = 1, \forall j \tag{7}$$

$$\sum_{j=1}^{n} x_{ij} = 1, \forall i \tag{8}$$

$$x_{ij} \in \{0, 1\}, i, j \in \{1, \ldots, n\} \tag{9}$$

The QBP represented by Equation (6) may be subject to the conditions that each physical qubit has exactly one respective logical qubit assigned to the each physical qubit according to Equation (7), and each logical qubit is assigned to exactly one respective physical qubit according to Equation (8). Additionally, the $x_{ij}$ term may be a routing length minimization term having binary values including a first value of zero or a second value of one according to Equation (9). Applying the constraints described in Equations (7) through (9) to a quantum circuit described according to Equation (5) may further simplify and allow the optimization problem to be more efficiently solved to output one or more initial qubit mappings.

The QAP 150 may be obtained by the QAP solver 160, and the QAP solver 160 may be configured to output the qubit mapping 170. In some embodiments, the QAP solver 160 may be a quantum computer configured to use a quantum computing approach to solve optimization problems, such as the QAP 150. Additionally or alternatively, the QAP solver 160 may be a classical computing system that emulates a quantum computing approach. Additionally or alternatively, the QAP solver 160 may include a classical software solver that is configured to obtain and solve optimization problems. In some embodiments, the QAP 150 may include too many variables such that the QAP solver 160 has difficulty solving the QAP 150. In these and other embodiments, the initial QAP 150 may be decomposed into two or more smaller optimization problems to facilitate operations of the QAP solver 160.

The qubit mapping 170 output by the QAP solver 160 may specify the physical qubits of the quantum circuit 110 to which logical, virtual qubits are assigned. As described above in relation to the weighted graph 130 and the QAP 150, the gate depth may be determined according to an order in which operations of the quantum circuit 110 are performed and the qubits involved in performing the operations. One or more swap gates may be implemented to virtually reassign the initial positions of the qubits such that qubits involved in the operations of the quantum circuit 110 are adjacent to one another prior to commencing the operations, which may decrease the likelihood that the operations of the quantum circuit 110 are affected by errors associated with using swap gates, caused by environmental factors, or for any other reasons.

Modifications, additions, or omissions may be made to the environment 100 without departing from the scope of the present disclosure. For example, the designations of different elements in the manner described is meant to help explain concepts described herein and is not limiting. For instance, in some embodiments, the quantum circuit 110, the weighted graph 130, the QAP 150, and the qubit mapping 170 are delineated in the specific manner described to help with explaining concepts described herein but such delineation is not meant to be limiting. Further, the environment 100 may include any number of other elements or may be implemented within other systems or contexts than those described.

Figure 3:
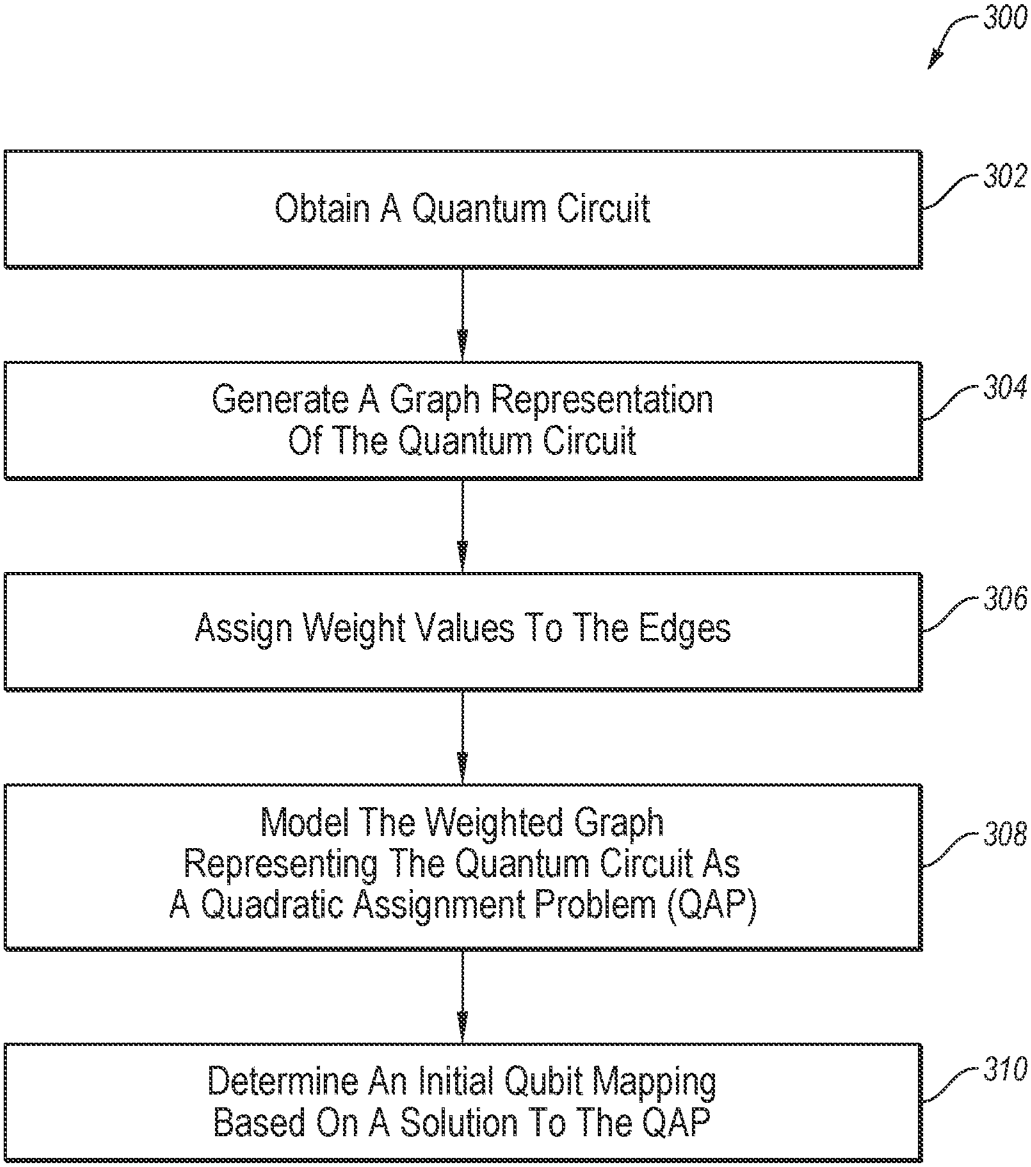
FIG. 3 is a flowchart of an example method of determining the initial qubit mapping according to one or more embodiments of the present disclosure.

FIG. 3 is a flowchart of an example method 300 of determining the initial qubit mapping according to one or more embodiments of the present disclosure. The method 300 may be performed by any suitable system, apparatus, or device. For example, the graphing module 120, the quadratic modeling module 140, and/or the QAP solver 160 of FIG. 1 may perform one or more operations associated with the method 300. Although illustrated with discrete blocks, the steps and operations associated with one or more of the blocks of the method 300 may be divided into additional blocks, combined into fewer blocks, or eliminated, depending on the particular implementation.

The method 300 may begin at block 302, where a quantum circuit may be obtained. In some embodiments, the quantum circuit may include an architecture that includes physical qubits connected to one another via two-qubit gates. The quantum circuit may include a sparse connection structure in which one or more of the qubits of the quantum circuit may not be connected to one or more other qubits via a two-qubit gate such that a direct connection may not exist between every pair of qubits included in the quantum circuit.

At block 304, a graph representation of the quantum circuit may be generated. In the graph representation of the quantum circuit, a particular qubit may be represented as a respective node of a graph, and a particular gate connecting two qubits may be represented as a respective edge between two nodes of the graph.

At block 306, weight values may be assigned to the edges. The weight values assigned to the edges may be based on a gate depth of a corresponding node to which the edges relate. In some embodiments, nodes involved in earlier operations of the quantum circuit may include lower gate depths and may be accorded greater weight value.

At block 308, the weighted graph representing the quantum circuit may be modeled as a QAP. In some embodiments, modeling the weighted graph as the QAP may involve generating a first matrix that quantifies connections between the nodes (e.g., a flow matrix) and a second matrix that quantifies distances between the nodes (e.g., a distances matrix). In these and other embodiments, weight values assigned to the edges based on the gate depth may be considered to adjust one or more elements of the first and/or the second matrices used to model the QAP. For example, the QAP may be represented by the Equation (5) described in relation to the operating environment 100 of FIG. 1.

Additionally or alternatively, the weighted graph may be modeled as a QBP that specifies binary constraints for one or more variables involved in the optimization problem. For example, the QBP may be represented by the Equation (6) described in relation to the operating environment 100 of FIG. 1.

At block 310, an initial qubit mapping may be determined based on a solution to the QAP. In some embodiments, a quantum computing approach may be used to solve the QAP and provide one or more feasible solutions to the QAP.

Modifications, additions, or omissions may be made to the method 300 without departing from the scope of the disclosure. For example, the designations of different elements in the manner described is meant to help explain concepts described herein and is not limiting. Further, the method 300 may include any number of other elements or may be implemented within other systems or contexts than those described.

Figure 4:
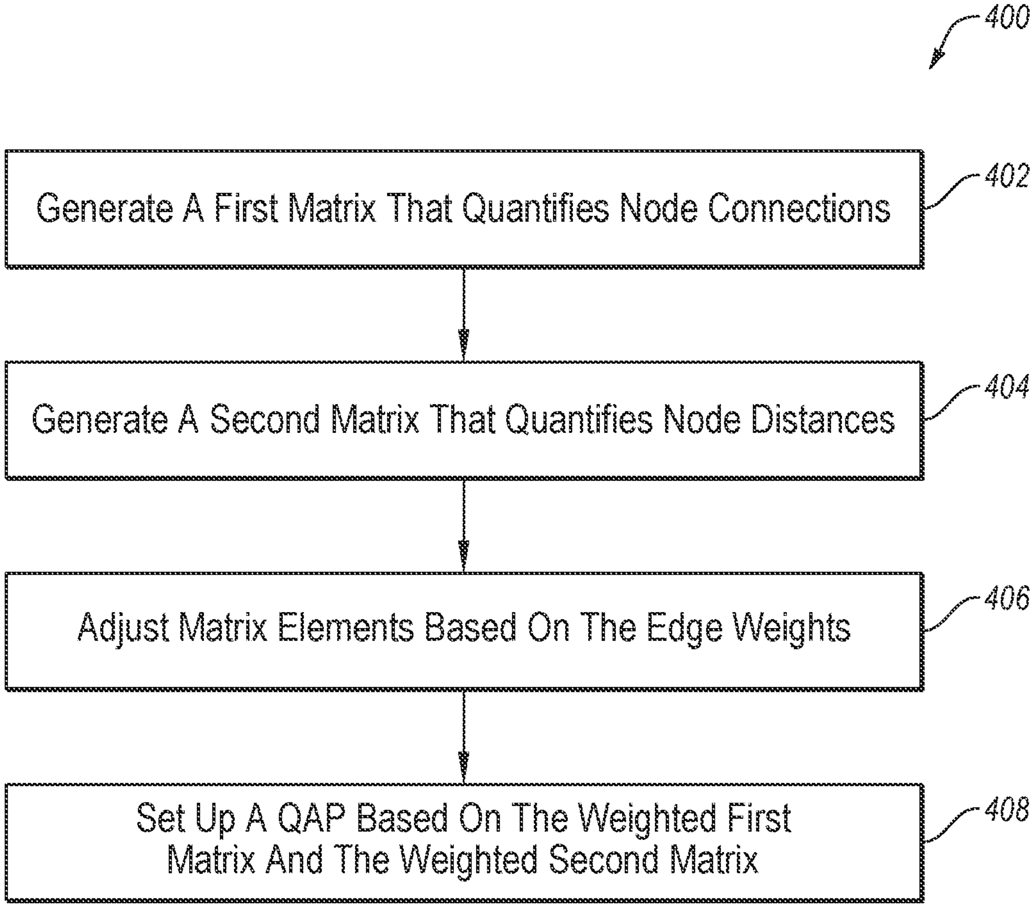
FIG. 4 is a flowchart of an example method of generating a Quadratic Assignment Problem corresponding to a qubit graph according to one or more embodiments of the present disclosure.

FIG. 4 is a flowchart of an example method 400 of generating a QAP corresponding to a qubit graph according to one or more embodiments of the present disclosure. The method 400 may be performed by any suitable system, apparatus, or device. For example, the graphing module 120, the quadratic modeling module 140, and/or the QAP solver 160 of FIG. 1 may perform one or more operations associated with the method 400. Although illustrated with discrete blocks, the steps and operations associated with one or more of the blocks of the method 400 may be divided into additional blocks, combined into fewer blocks, or eliminated, depending on the particular implementation.

The method 400 may begin at block 402, where a first matrix that quantifies node connections may be generated. In some embodiments, the first matrix may be a flow matrix, such as the flow matrix described above in relation to the graphing module 120 of FIG. 1.

At block 404, a second matrix that quantifies node distances may be generated. In some embodiments, the second matrix may be a distances matrix, such as the distances matrix described above in relation to the graphing module 120 of FIG. 1.

At block 406, one or more matrix elements may be adjusted based on edge weights associated with the gate depths of one or more of the qubit gates included in the quantum circuit. In some embodiments, a first qubit gate used in a first operation scheduled to be performed before a second operation involving a second qubit gate may be given greater weight than the second qubit gate. In these and other embodiments, the weight values corresponding to respective qubit gates may be used to modify one or more elements of the first matrix and/or of the second matrix.

At block 408, a QAP may be set up based on the weighted first and second matrices. In some embodiments, the QAP may be a QBP that includes binary constraints, such as the QBP described in relation to the Equation (6) of FIG. 1.

Modifications, additions, or omissions may be made to the method 400 without departing from the scope of the disclosure. For example, the designations of different elements in the manner described is meant to help explain concepts described herein and is not limiting. Further, the method 400 may include any number of other elements or may be implemented within other systems or contexts than those described.

Figure 5:
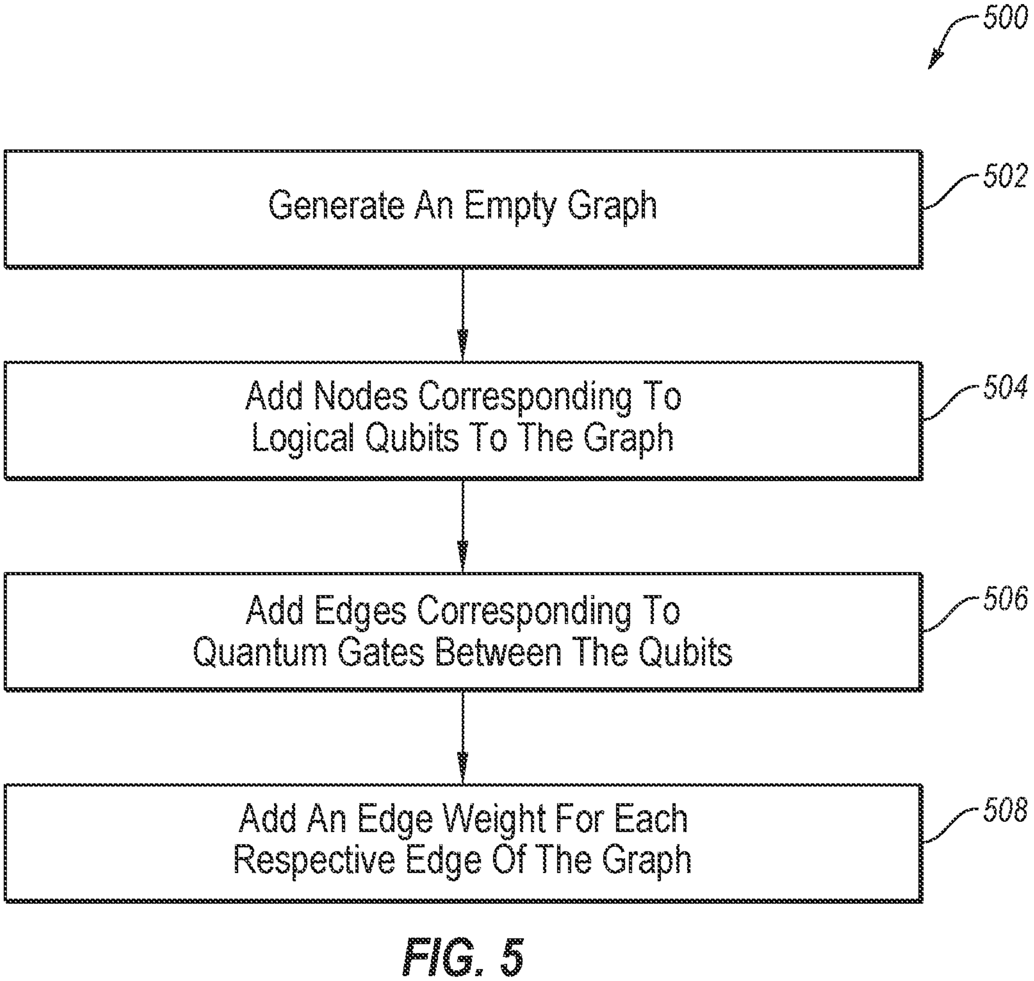
FIG. 5 is a flowchart of an example method of generating a graph representation of the qubits of the quantum computing system according to one or more embodiments of the present disclosure.

FIG. 5 is a flowchart of an example method 500 of generating a graph representation of the qubits of the quantum computing system according to one or more embodiments of the present disclosure. The method 500 may be performed by any suitable system, apparatus, or device. For example, the graphing module 120, the quadratic modeling module 140, and/or the QAP solver 160 of FIG. 1 may perform one or more operations associated with the method 500. Although illustrated with discrete blocks, the steps and operations associated with one or more of the blocks of the method 500 may be divided into additional blocks, combined into fewer blocks, or eliminated, depending on the particular implementation.

The method 500 may begin at block 502, where an empty graph is generated. For example, an empty graph, H, may be generated.

At block 504, nodes corresponding to logical qubits of a quantum circuit may be added to the empty graph. For example, a particular quantum circuit may include Q qubits, so a corresponding number of nodes, Q, may be added to the empty graph, H.

At block 506, edges corresponding to quantum gates of the quantum circuit may be added to the graph between the nodes. For example, the particular quantum circuit described in relation to block 504 may include M two-qubit gates, so a corresponding number of edges, M, may be added to the graph, H.

At block 508, an edge weight may be added for each respective edge of the graph. The edge weights may represent an order in which the qubit gates of the quantum circuit are used in operations of the quantum circuit. For example, a particular quantum circuit that is configured to perform N operations may include N edge weights in a range of $\{1, 2, \ldots, N-1, N\}$. As an additional or alternative example, qubit gates associated with earlier-scheduled operations may be given greater weights, while qubit gates associated with later-scheduled operations may be given lesser weights depending on how the QAP is specified (e.g., as a maximization problem rather than as a minimization problem).

Modifications, additions, or omissions may be made to the method 500 without departing from the scope of the disclosure. For example, the designations of different elements in the manner described is meant to help explain concepts described herein and is not limiting. Further, the method 500 may include any number of other elements or may be implemented within other systems or contexts than those described.

Figure 6:
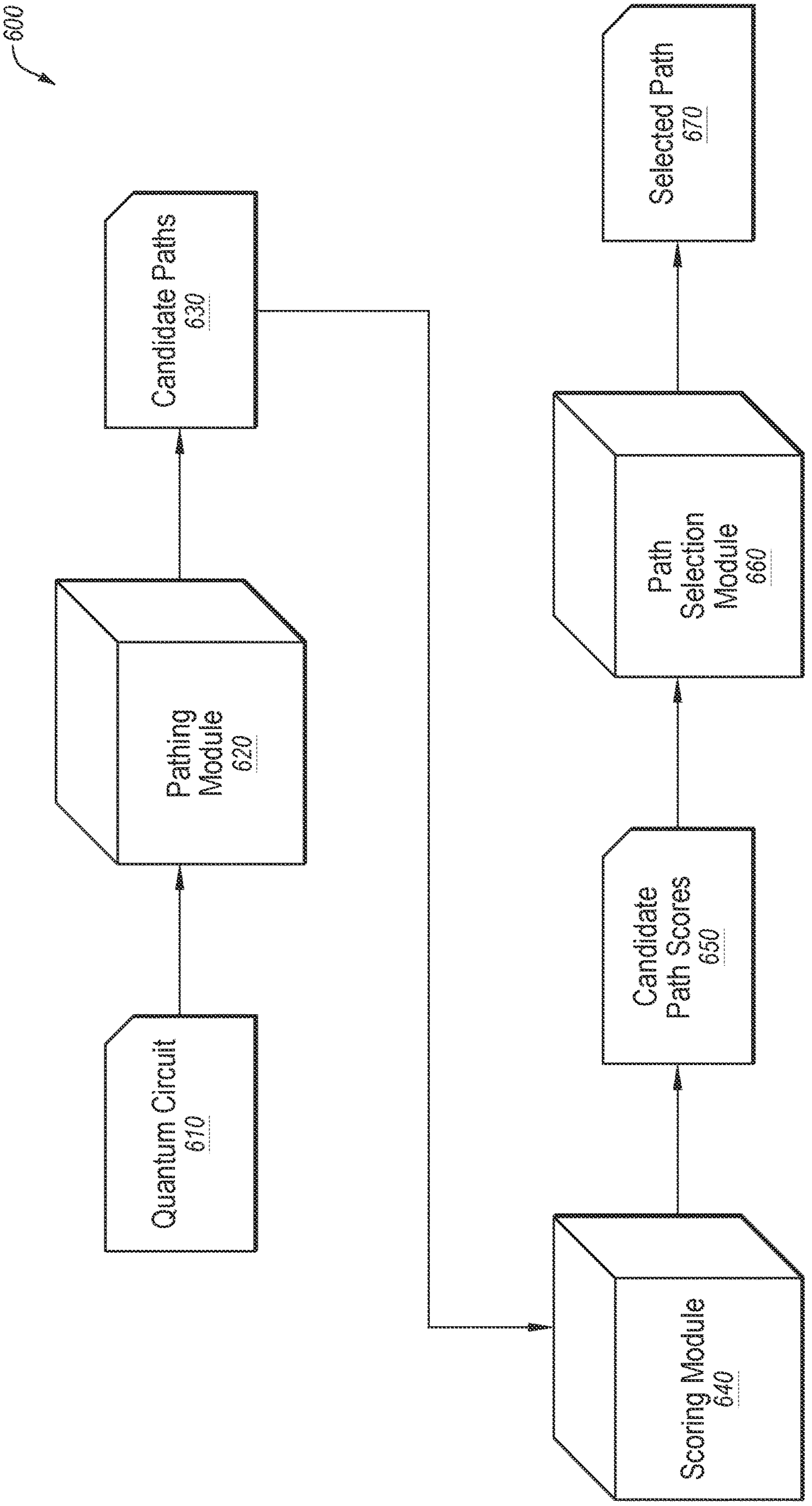
FIG. 6 is a diagram of an example operating environment in which qubit routing may be determined according to one or more embodiments of the present disclosure.

FIG. 6 is a diagram of an example operating environment 600 in which qubit routing may be determined according to one or more embodiments of the present disclosure. The operating environment 600 may include a pathing module 620, a scoring module 640, and/or a path selection module 660 that are configured to obtain as input and/or output a quantum circuit graph 610, candidate paths 630, candidate path scores 650, and/or a selected path 670.

In some embodiments, the pathing module 620, the scoring module 640, and/or the path selection module 660 (collectively referred to herein as "the computing modules") may include code and routines configured to enable a computing system to perform one or more operations. Additionally or alternatively, one or more of the computing modules may be implemented using hardware including a processor, a microprocessor (e.g., to perform or control performance of one or more operations), a field-programmable gate array (FPGA), or an application-specific integrated circuit (ASIC). In some other instances, one or more of the computing modules may be implemented using a combination of hardware and software. In the present disclosure, operations described as being performed by the computing modules may include operations that the computing modules may direct one or more corresponding systems to perform. The computing modules may be configured to perform a series of operations with respect to the quantum circuit graph 610, the candidate paths 630, the candidate path scores 650, and/or the selected path 670 as described in further detail below and in relation to an example method 800 and/or an example method 900 as described with respect to FIGS. 8 and/or 9, respectively.

A NISQ device may include a quantum circuit that is configured to perform computational operations. The quantum circuit may include quantum bits ("qubits") that are connected by gates between pairs of qubits ("two-qubit gates" or "qubit gates"), and a graph modeling the quantum circuit may represent the qubits as nodes and the qubit gates as edges connecting the nodes. In some embodiments, the quantum circuit graph 610 may represent a hardware architecture corresponding to the quantum circuit. In other words, the nodes and edges included in quantum circuit graph 610 may visually represent the physical qubits and qubit gates of the corresponding quantum circuit.

Operations of the pathing module 620, the scoring module 640, and/or the path selection module 660 resulting in determination of the candidate paths 630, the candidate path scores 650, and/or the selected path 670 that describe swap gate operations may refer to logical qubits and/or qubit gates rather than the physical hardware architecture of the quantum circuit itself. For example, a swap gate operation that swaps a position associated with a first qubit with a position associated with a second qubit may indicate that the physical second qubit may be assigned to logically perform operations associated with the first qubit rather than swapping physical positions with the first qubit. Performing one or more swap gate operations over a quantum circuit may facilitate connecting any two qubits included in the quantum circuit across a single qubit gate.

In some embodiments, the quantum circuit graph 610 may include a series of node pairs that indicate the order in which operations are scheduled to be performed by the represented quantum circuit. A particular operation of the quantum circuit may involve two qubits that are adjacent to one another and connected by a two-qubit gate (or in other words, the two qubits are "directly connected" at a target edge). However, the qubits involved in the operations may not be adjacent to one another due to the sparse connectivity of the quantum circuit, swap gate operations relating to previous operations of the quantum circuit that have shifted the logical positions of the qubits apart from one another, some combination thereof, or for any other reasons.

The pathing module 620 may be configured to identify one or more candidate paths 630 between each pair of nodes representing qubits scheduled to perform operations of the quantum circuit. A particular candidate path 630 may specify a route from a first node to a second node on which swap gate operations may be performed to move one or both of the first and the second nodes until the first and the second nodes are directly connected.

Figure 7A:
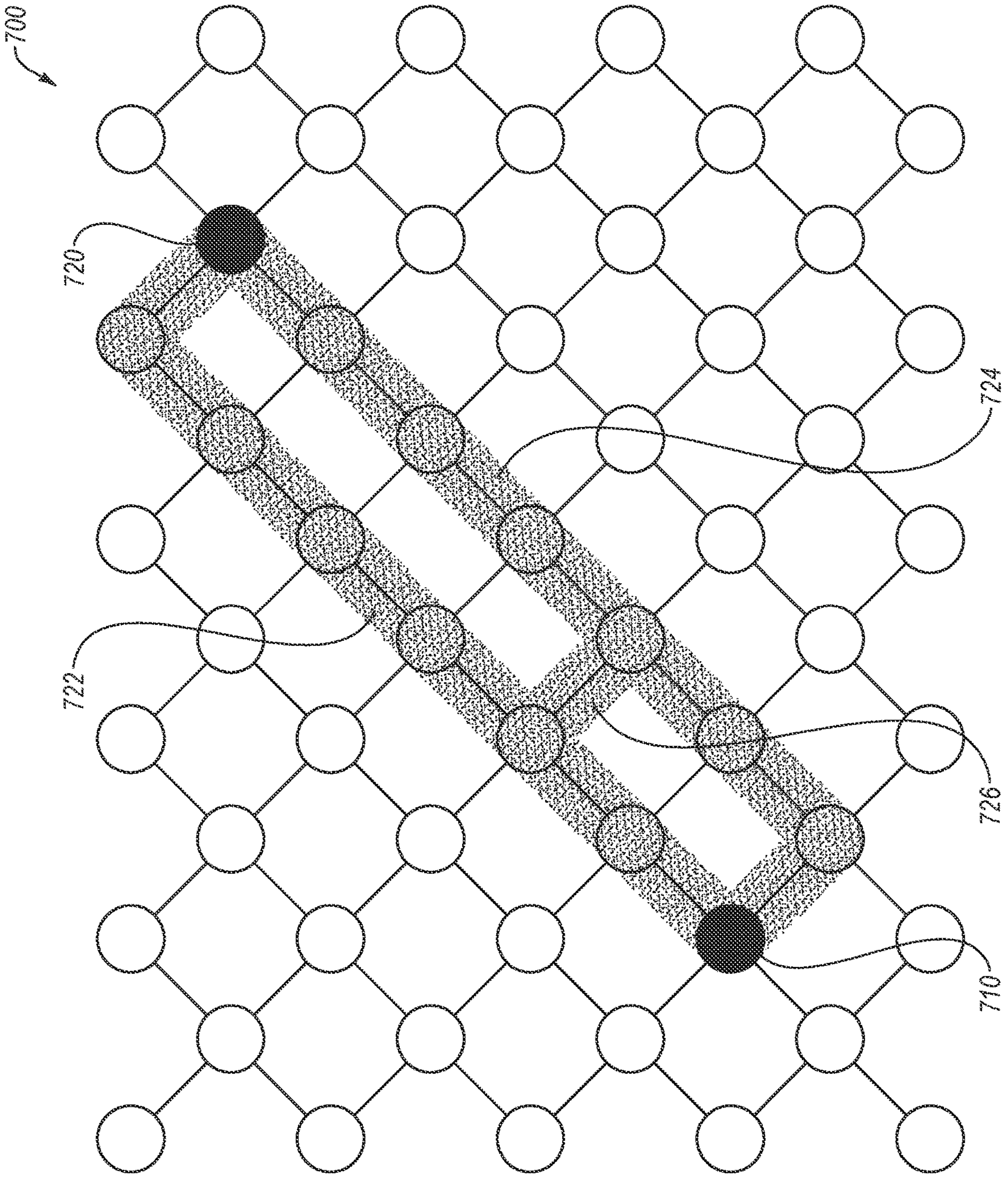
FIG. 7A illustrates an example graph that includes a set of candidate paths between two qubits of a quantum computing system.

For example, FIG. 7A illustrates an example graph 700 that includes a set of candidate paths that are representative of the candidate paths 630 between two qubits of a quantum circuit. The graph 700 includes a first node 710 and a second node 720, which are originally not directly connected to one another. As illustrated, the pathing module 620 may propose three (or more) candidate paths including a first candidate path 722, a second candidate path 724, and a third candidate path 726. Performing swap gate operations with respect to either the first node 710 or the second node 720 along the first candidate path 722, the second candidate path 724, or the third candidate path 726 may result in the first node 710 and the second node 720 being directly connected with one another.

Figure 8:
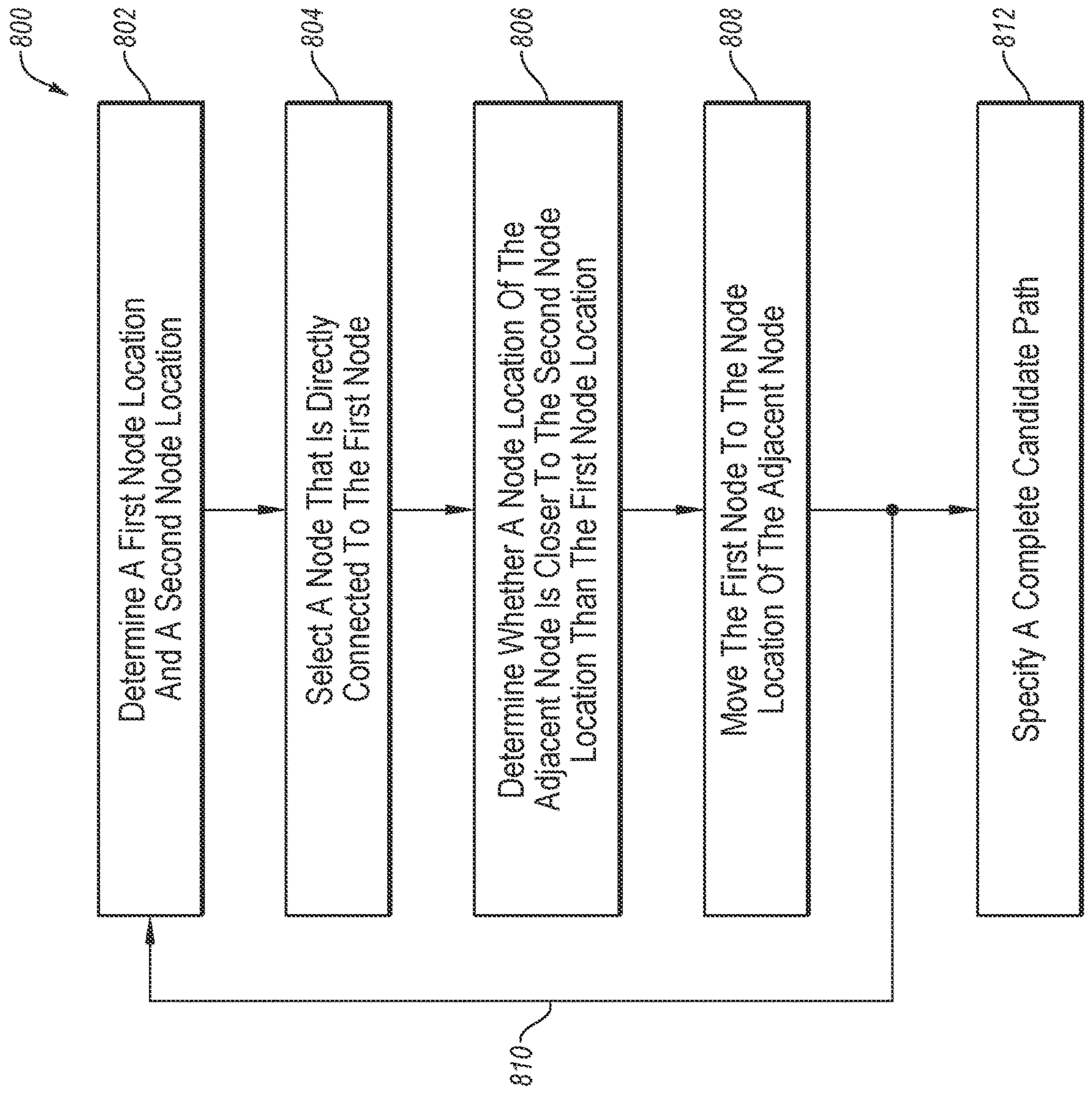
FIG. 8 is a flowchart of an example method of generating a candidate path according to one or more embodiments of the present disclosure.

In some embodiments, the pathing module 620 may be configured to generate a particular candidate path according to an example method 800 as described in relation to FIG. 8. The method 800 may be performed by any suitable system, apparatus, or device. For example, the pathing module 620, the scoring module 640, and/or the path selection module 660 of FIG. 6 may perform one or more operations associated with the method 800. Although illustrated with discrete blocks, the steps and operations associated with one or more of the blocks of the method 800 may be divided into additional blocks, combined into fewer blocks, or eliminated, depending on the particular implementation.

The method 800 may begin at block 802, where a first node location corresponding to a first node and a second node location corresponding to a second node are determined. The first node and the second node may represent logical qubits of a quantum circuit that are configured to perform one or more computational operations. To perform the computational operations, the qubits corresponding to the first node and the second node may need to be directly connected to one another via a target edge between the first node and the second node.

The first node location and the second node location may be determined according to the positions of the first node and the second node with respect to the physical hardware of the quantum circuit. For example, the first node location may correspond to a location of the physical qubit of the quantum circuit with which the first node is associated, and the second node location may correspond to a location of the physical qubit with which the second node is associated.

At block 804, a node that is directly connected to the first node may be selected. As the first node is connected to one or more neighboring nodes, a respective number of edges may extend from the first node to the neighboring nodes. One or more of the neighboring nodes may be selected as the node that is directly connected to the first node. In some embodiments, the selection of the neighboring nodes may be performed at random such that any nodes adjacent to the first node are equally likely to be selected. For example, a particular first node that includes ten edges connecting to neighboring nodes may have any of the ten neighboring nodes selected at a ten percent chance.

Additionally or alternatively, the selection of the neighboring nodes may be performed contingent on the following step of the method 800. At block 806, whether the node location of the adjacent node is closer to the second node location than the first node location may be determined. Determining whether the node location of the adjacent node is closer to the second node location in comparison to the first node location may be performed by computing a first distance between the first node location and the second node location and a second distance between the adjacent node location and the second node location. Responsive to determining that the second distance is longer than the first distance (i.e., the adjacent node location is farther from the second node location relative to the first node location), the adjacent node may be discarded from consideration as being part of a candidate path between the first node and the second node.

At block 808, the first node may be moved to the node location corresponding to the adjacent node responsive to determining that the second distance is shorter than the first distance (i.e., the adjacent node location is closer to the second node location relative to the first node location). Whether the adjacent node may be selected to be part of the candidate path according to the steps described in relation to blocks 804, 806, and 808 may be represented by the following quantitative relationship:

$$\min\{0, d(i, v) - d(j, v)\} \tag{10}$$

Statement (10) describes a proportional probability for deciding whether to include a particular adjacent node as part of a particular candidate path. Responsive to a first distance, d(i,v), between a first node location, i, and a second node location, v, being less than a second distance, d(j,v), between the adjacent node location, j, and the second node location, v, Statement (10) indicates that the proposed adjacent node location is farther from the second node location than the first node location. Consequently, the proposed adjacent node location and the respective adjacent node may be rejected. Responsive to the first distance being greater than the second distance, Statement (10) indicates that the proposed adjacent node location is closer to the second node location than the first node location. Consequently, the proposed adjacent node location and the respective adjacent node may be accepted as being part of the particular candidate path.

The method 800 may be iteratively repeated at step 810 to include additional adjacent nodes and increase a length of the candidate path. As illustrated in FIG. 7A for example, a distance between the first node 710 and the second node 720 along the first candidate path 722, the second candidate path 724, or the third candidate path 726 includes six additional nodes. In other words, six swap gate operations would be used to position the first node 710 adjacent to the second node 720 according to the first candidate path 722, the second candidate path 724, or the third candidate path 726.

At block 812, a complete candidate path may be specified. In some embodiments, the candidate path may be considered a complete candidate path after iteratively performing the method 800 at the blocks 802, 804, 806, and 808 and the step 810, and a length of the candidate path matches a distance between the first node and the second node. In these and other embodiments, the operations associated with the method 800 may be performed to generate any number of candidate paths. For example, the number of candidate paths generated may be specified by a user, and the operations of the method 800 may be repeatedly performed to generate a set of candidate paths that includes the number of candidate paths specified by the user. As an additional or alternative example, the operations of the method 800 may be repeatedly performed until a newly generated candidate path is identical to an existing candidate path already included in the set generated candidate paths.

Modifications, additions, or omissions may be made to the method 800 without departing from the scope of the disclosure. For example, the designations of different elements in the manner described is meant to help explain concepts described herein and is not limiting. Further, the method 800 may include any number of other elements or may be implemented within other systems or contexts than those described.

Returning to the description of FIG. 6, the candidate paths 630 may be obtained by the scoring module 640, which may output candidate path scores 650. A particular candidate path score 650 may describe how well a pair that includes a particular candidate path 630 and a particular edge along the particular candidate path 630 satisfies optimization constraints. The optimization constraints, as described in further detail below in relation to Equation (11), may include, for example, decreasing the number of swap gate operations used to directly connect two qubits. Additionally or alternatively, the optimization constraints may include performing swap gate operations in such a way to facilitate a particular direct connection between two qubits that does not increase the number of swap gate operations used to directly connect qubits involved in future operations. A particular pair including a particular candidate path 630 and a particular edge computed as having a greater candidate path score 650 may provide a more efficient route between a first node and a second node than another pair having a lower candidate path score 650.

Figure 7B:
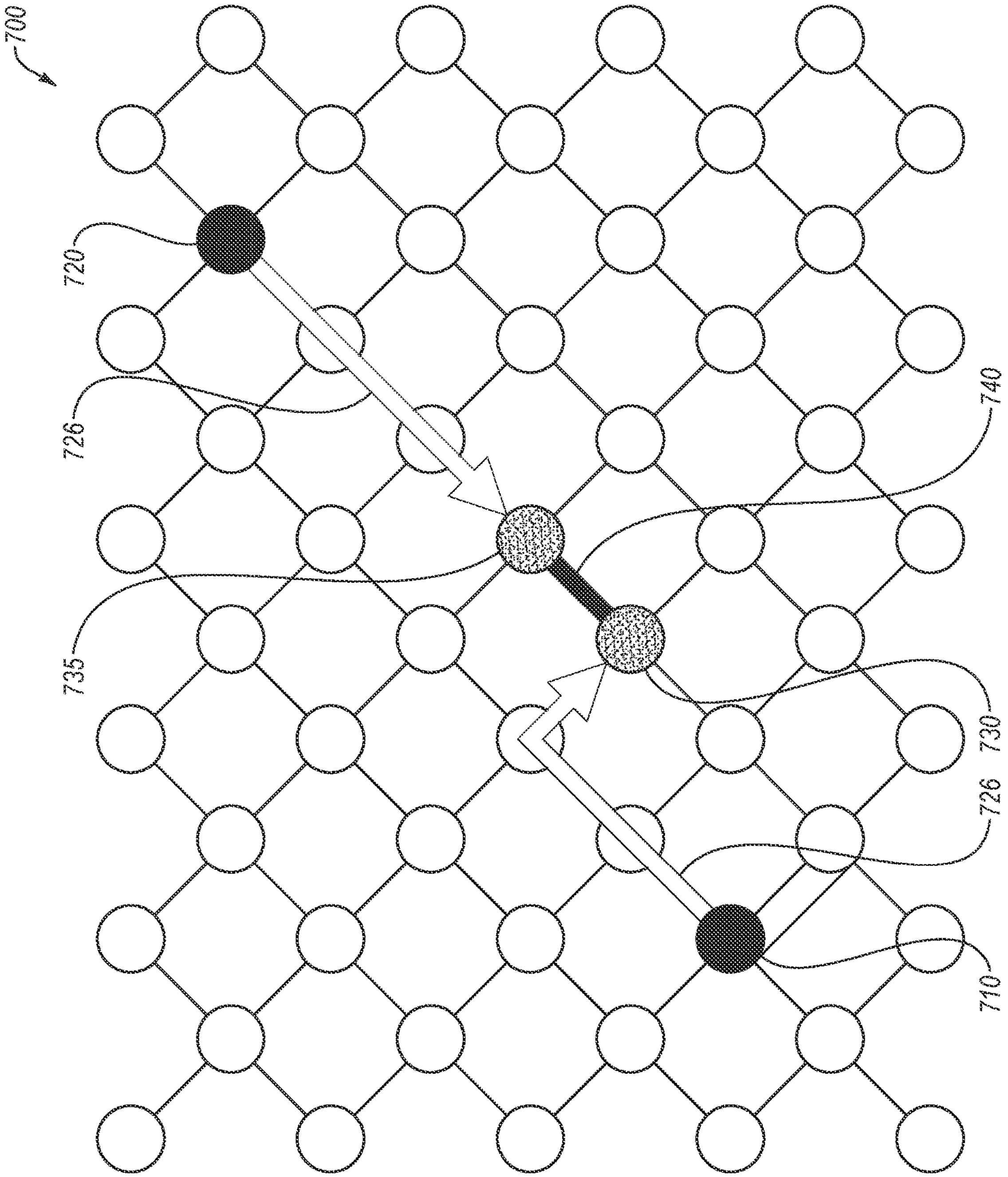
FIG. 7B illustrates the graph depicting a particular pair that includes a particular candidate path and an edge included in the particular candidate path that connects the two qubits of the quantum computing system.

For example, FIG. 7B illustrates the graph 700 depicting a particular pair that includes a particular candidate path that is the same as the third candidate path 726 and an edge 740 included in the particular candidate path 726 that connects two qubits of the quantum computing system. The candidate path 726 may illustrate one route through which the first qubit 710 and the second qubit 720 may be moved. As illustrated in FIG. 2B, a particular edge 740 along the candidate path 726 may be selected as the edge 240 that directly connects the first node 710 and the second node 720. For the edge 740 to directly connect the two nodes, the first node 710 may be moved to a first node location 730, and the second node 720 may be moved to a second node location 735 with the edge 740 connecting the first node location 730 and the second node location 735. Although the edge 740 is illustrated as appearing equidistant between the first node 710 and the second node 720, the edge 740 may be positioned at any edge between the first node 710 and the second node 720, resulting in a different pair that includes the candidate path 726 and a different edge.

Returning to the description of FIG. 6, in some embodiments, the candidate path score 650 may be weighted with respect to an order in which operations of the quantum circuit are performed. A first operation scheduled to be performed earlier than a second operation of the quantum circuit may be weighed more heavily because routing qubits for the first operation may impact how qubits are routed for the second operation. Additionally or alternatively, the candidate path score 650 may account for a distance between two or more nodes involved in subsequent operations of the quantum circuit after routing a prior pair of nodes as it may be desirable to decrease the distance between the two or more nodes involved in the subsequent operations while routing qubits associated with an earlier scheduled operation.

In these and other embodiments, the scoring module 640 may be configured to compute the candidate path score 650 according to the following equation:

$$\delta_G(e, p) = S(g_i, e, p) + \sum_{g_k \in G} \lambda^{w(g_k)} \cdot d_{g_i,e,p}(g_k) \tag{11}$$

in which $\delta_G$(e,p) represents the candidate path score 650. S($g_i$,e,p) represents a number of swap gate operations used to route a first node, $g_i$, to a second node, e, through a candidate path, p. A prioritization factor based on the order in which the operations of the quantum circuit are scheduled to be performed, $\lambda^{w(gk)}$, and a distance between the nodes after routing the first node to the second node, $d_{gi,e,p}(g_k)$, may be used to assess a total cost relating to all remaining operations of the quantum circuit after routing the first node to the second node.

The prioritization factor, $\lambda^{w(gk)}$, may include a base value, $\lambda$ greater than zero and less than one, and an integer exponent, w($g_k$), that corresponds to the order in which operations of the quantum circuit are scheduled to be performed. Earlier-scheduled operations may consequently yield greater prioritization factors, while later-scheduled operations may yield smaller prioritization factors as the exponent increases. Thus, the candidate path score 650 corresponding to a pair including a particular candidate path 630 and a particular edge relating to an earlier-scheduled operation (e.g., a first operation out of fifty scheduled operations of the quantum circuit) may be scored higher than a pair relating to a later-scheduled operation (e.g., a fiftieth operation).

The path selection module 660 may be configured to select a particular pair of candidate paths and edges based on the candidate path scores 650 computed by the scoring module 640. Selection of the particular pair of candidate paths and edges may be based on selecting the particular pair of candidate paths and edges that include the greatest and/or the lowest candidate path scores depending on whether a higher or a lower candidate path score indicates a more efficient qubit routing.

In some embodiments, the path selection module 660 may output the selected path 670 according to the following equation:

$$D_G(P_{uv}) = \text{argmin}_{e,p}\{\delta_G(e, p): e \in p, p \in P_{uv} \tag{12}$$

in which a pair of a candidate path and a target edge having the highest score, $D_G(P_{uv})$, is selected based on a corresponding candidate path score, $\delta_G(e,p)$, that selects a particular edge, e, included in a particular candidate path 630, p, which may itself be included in a set of candidate paths, $P_{uv}$.

The selected path 670 may include one path included in the set of candidate paths 630 outputted by the pathing module 620 and a target edge included in the one selected path. The target edge may indicate which edge along the selected path 670 is designated as the edge that directly connects the first node and the second node that are routed along the selected path 670. As such, the selected path 670 may specify how to perform swap gate operations for both the first node and the second node such that the two nodes become directly connected.

In some embodiments, the pathing module 620, the scoring module 640, and the path selection module 660 may iteratively perform operations based on the number of operations that the quantum circuit, to which the quantum circuit graph 610 relates, is configured to perform. For example, after determining a selected path 670 with respect to a first node and a second node configured to perform a first operation of the quantum circuit, the pathing module 620, the scoring module 640, and the path selection module 660 may determine a path and a target edge corresponding to a third node and a fourth node configured to perform a second operation of the quantum circuit. The environment 600 may facilitate determining the selected path 670 that represents a route for each pair of qubits configured to perform a particular set of operations scheduled by a quantum circuit.

Modifications, additions, or omissions may be made to the environment 600 without departing from the scope of the present disclosure. For example, the designations of different elements in the manner described is meant to help explain concepts described herein and is not limiting. For instance, in some embodiments, the quantum circuit graph 610, the candidate paths 630, the candidate path scores 650, and/or the selected path 670 are delineated in the specific manner described to help with explaining concepts described herein but such delineation is not meant to be limiting. Further, the environment 600 may include any number of other elements or may be implemented within other systems or contexts than those described.

Figure 9:
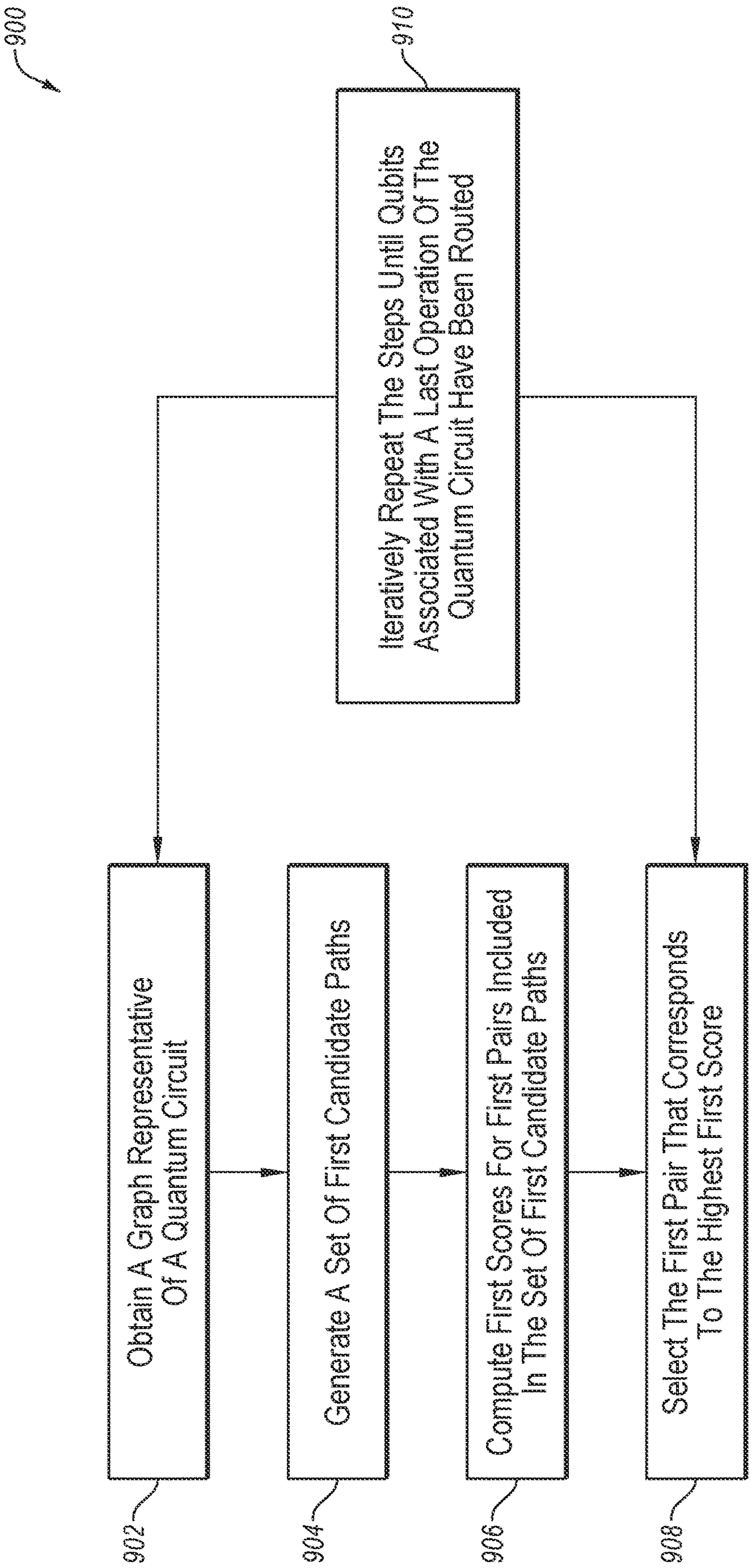
FIG. 9 is a flowchart of an example method of determining qubit routing according to one or more embodiments of the present disclosure.

FIG. 9 is a flowchart of an example method 900 of determining qubit routing according to one or more embodiments of the present disclosure. The method 900 may be performed by any suitable system, apparatus, or device. For example, the pathing module 620, the scoring module 640, and/or the path selection module 660 of FIG. 6 may perform one or more operations associated with the method 900. Although illustrated with discrete blocks, the steps and operations associated with one or more of the blocks of the method 900 may be divided into additional blocks, combined into fewer blocks, or eliminated, depending on the particular implementation.

The method 900 may begin at block 902, where a graph that represents a quantum circuit may be obtained. The graph may include nodes that represent qubits of the quantum circuit and edges that represent qubit gates that connect the qubits. In some embodiments, the graph may represent a physical architecture of the quantum circuit including the physical qubits and connecting qubit gates between the physical qubits. Additionally or alternatively, the graph may represent a logical representation of the quantum circuit corresponding to the physical architecture in which the locations associated with the qubits may be logically swapped. For example, a first physical qubit may be configured to logically perform operations corresponding to a second physical qubit, which may be represented in the graph by swapping a location of a first node corresponding to the first physical qubit with a location of a second node corresponding to the second physical qubit without swapping the physical locations of the qubits.

At block 904, a set of first candidate paths between a first node and a second node may be generated. A candidate path included in the set of first candidate paths may specify a path along which the first node and the second node move to arrive at a target edge between the first node and the second node.

At block 906, first scores corresponding to one or more first pairs may be computed in which each first pair represents a particular first candidate path and a particular target edge included in the particular first candidate path. A particular first score may indicate how efficiently a respective first pair routes the first node to the target edge directly connecting to the second node. In some embodiments, the first scores may be weighted with respect to an order in which operations of the quantum circuit including a qubit corresponding to the first node and a qubit corresponding to the second node are performed with earlier operations of the quantum circuit being weighted more heavily than later operations of the quantum circuit.

At block 908, a first pair that corresponds to the highest first score may be selected. The selected first pair may specify a particular path of nodes included in the graph of the quantum circuit along which swap gate operations may be performed to logically move the first node and/or the second node to locations adjacent to one another across a particular target edge.

At block 910, the steps described in relation to the blocks 902, 904, 906, and 908 may be repeated until qubits associated with a last operation of the quantum circuit have been routed. Performing the steps described in relation to the method 900 at blocks 902, 904, 906, and 908 may facilitate determining a route between a first qubit and a second qubit of a quantum circuit and how to perform one or more swap gate operations with respect to the first qubit and the second qubit to position the two qubits adjacent to one another along a target edge. Iteratively performing the steps of the method 900 for each operation scheduled to be performed by the quantum circuit may facilitate routing and positioning of some or all of the qubits involved in performing the operations of the quantum circuit.

Modifications, additions, or omissions may be made to the method 900 without departing from the scope of the disclosure. For example, the designations of different elements in the manner described is meant to help explain concepts described herein and is not limiting. Further, the method 900 may include any number of other elements or may be implemented within other systems or contexts than those described.

Figure 10:
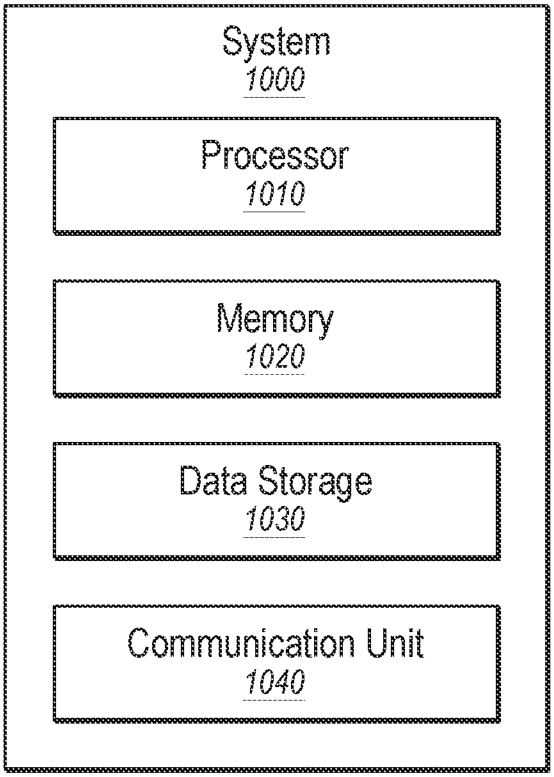
FIG. 10 is an example computer system according to one or more embodiments of the present disclosure.

FIG. 10 is an example computer system 1000 according to one or more embodiments of the present disclosure. The computing system 1000 may include a processor 610, a memory 1020, a data storage 1030, and/or a communication unit 1040, which all may be communicatively coupled. Any or all of the environment 100 of FIG. 1 and/or the environment 600 of FIG. 6 may be implemented as a computing system consistent with the computing system 1000.

Generally, the processor 1010 may include any suitable special-purpose or general-purpose computer, computing entity, or processing device including various computer hardware or software modules and may be configured to execute instructions stored on any applicable computer-readable storage media. For example, the processor 1010 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 10, it is understood that the processor 1010 may include any number of processors distributed across any number of network or physical locations that are configured to perform individually or collectively any number of operations described in the present disclosure. In some embodiments, the processor 1010 may interpret and/or execute program instructions and/or process data stored in the memory 1020, the data storage 1030, or the memory 1020 and the data storage 1030. In some embodiments, the processor 1010 may fetch program instructions from the data storage 1030 and load the program instructions into the memory 1020.

After the program instructions are loaded into the memory 1020, the processor 1010 may execute the program instructions, such as instructions to cause the computing system 1000 to perform the operations of the method 300 of FIG. 3, the method 400 of FIG. 4, the method 500 of FIG. 5, the method 800 of FIG. 8, and/or the method 900 of FIG. 9. For example, the computing system 1000 may execute the program instructions to obtain a quantum circuit, generate a graph representation of the quantum circuit, assign weight values to edges included in the graph, model the weighted graph representing the quantum circuit as a QAP, and/or determine an initial qubit mapping based on a solution to the QAP. As an additional or alternative example, the computing system 1000 may execute the program instructions to obtain a graph representative of a quantum circuit, generate a set of first candidate paths, compute first scores for first pairs included in the set of first candidate paths, and/or select the first pair that corresponds to the highest first score.

The memory 1020 and the data storage 1030 may include computer-readable storage media or one or more computer-readable storage mediums for having computer-executable instructions or data structures stored thereon. Such computer-readable storage media may be any available media that may be accessed by a general-purpose or special-purpose computer, such as the processor 1010. For example, the memory 1020 and/or the data storage 1030 may include the quantum circuit 110, the weighted graph 130, the QAP 150, and/or the qubit mapping 170 of FIG. 1. As an additional or alternative example, the memory 1020 and/or the data storage 1030 may include the quantum circuit graph 610, the candidate paths 630, the candidate path scores 650, and/or the selected path 670 of FIG. 6. In some embodiments, the computing system 1000 may or may not include either of the memory 1020 and the data storage 1030.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 1010 to perform a particular operation or group of operations.

The communication unit 1040 may include any component, device, system, or combination thereof that is configured to transmit or receive information over a network. In some embodiments, the communication unit 1040 may communicate with other devices at other locations, the same location, or even other components within the same system. For example, the communication unit 1040 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 1040 may permit data to be exchanged with a network and/or any other devices or systems described in the present disclosure. For example, the communication unit 1040 may allow the system 1000 to communicate with other systems, such as computing devices and/or other networks.

One skilled in the art, after reviewing this disclosure, may recognize that modifications, additions, or omissions may be made to the system 1000 without departing from the scope of the present disclosure. For example, the system 1000 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:

obtaining a graph that includes a plurality of nodes and a plurality of edges in which a first node of the plurality of nodes represents a first qubit of a quantum circuit and a second node of the plurality of nodes represents a second qubit of the quantum circuit;

generating a set of first candidate paths between the first node and the second node along one or more edges of the plurality of edges, each first candidate path in the set of first candidate paths specifying a path along which the first node and the second node move to arrive adjacent to one another at a target edge that directly connects the first node and the second node;

computing first scores for a plurality of first path pairs, a respective first score indicating how efficiently each first path pair of the plurality of first path pairs routes the first node to the second node via the target edge, wherein:

a particular first path pair of the plurality of first path pairs includes a particular first candidate path and a particular target edge between the first qubit and the second qubit that lies on the particular first candidate path; and the first score is weighted with respect to an order in which operations of the quantum circuit including the first qubit and the second qubit are performed with earlier operations being weighted more heavily than later operations; and selecting the first path pair that corresponds to a highest first score for routing the first node to the second node via the target edge.

2. The method of claim 1, further comprising:

identifying a third node corresponding to a third qubit and a fourth node corresponding to a fourth qubit, the third qubit and the fourth qubit being configured to perform a second operation after a first operation performed by the first qubit and the second qubit;

generating a set of second candidate paths between the third node and the fourth node along one or more of the edges of the graph, each second candidate path in the set of second candidate paths specifying a path along which the third node and the fourth node move to arrive at a target edge between the third node and the fourth node;

computing second scores for a plurality of second path pairs, a respective second score indicating how efficiently each second path pair of the plurality of second path pairs routes the third node to the fourth node via the target edge; and selecting the second path pair that corresponds to a highest second score for routing the third node to the fourth node via the target edge.

3. The method of claim 2, further comprising repeating the steps of the method of claim 2 until nodes associated with qubits used in a last operation of the quantum circuit have been routed.

4. The method of claim 1, wherein generating a particular candidate path of the set of candidate paths comprises:

A) determining a first node location corresponding to the first node and a second node location corresponding to the second node;

B) identifying a fifth node that is directly connected to the first node, the fifth node having a fifth node location that is adjacent to the first node location;

C) determining whether the fifth node location is closer to the second node location than the first node location;

D) setting the first node location as the fifth node location responsive to determining that the fifth node location is closer to the second node location than the first node location; and E) iteratively repeating steps B), C), and D) until the first node location is adjacent to the second node location.

5. The method of claim 1, wherein computing the first scores for the plurality of first pairs is based on an order in which the operations of the quantum circuit to which the first node and the second node relate are scheduled to be performed and a distance between the nodes involved in subsequent operations of the quantum circuit after routing the first node and the second node.

6. The method of claim 5, wherein computing the first scores for the plurality of first pairs is represented as: $\delta_G(e,p)=S(g_i,e,p)+\Sigma_{gk\in G}\lambda^{W(gK)}\cdot d_{gi,ep}(g_k)$ in which:

$\delta_G(e,p)$ represents a particular first score;

$S(g_i,e,p)$ represents a number of swap gates used to route the first node, $g_i$, to the second node, e, through a particular candidate path, p;

$\lambda^{w(gk)}$ represents a prioritization factor based on the order in which the operations of the quantum circuit are scheduled to be performed; and $d_{gi,e,p}(g_k)$ represents the distance between the nodes after routing the first node to the second node along the particular candidate path.

7. One or more non-transitory computer-readable storage media configured to store instructions that, in response to being executed, cause a system to perform operations, the operations comprising:

obtaining a graph that includes a plurality of nodes and a plurality of edges in which a first node of the plurality of nodes represents a first qubit of a quantum circuit and a second node of the plurality of nodes represents a second qubit of the quantum circuit;

generating a set of first candidate paths between the first node and the second node along one or more edges of the plurality of edges, each first candidate path in the set of first candidate paths specifying a path along which the first node and the second node move to arrive adjacent to one another at a target edge that directly connects the first node and the second node;

computing first scores for a plurality of first path pairs, a respective first score indicating how efficiently each first path pair of the plurality of first path pairs routes the first node to the second node via the target edge, wherein:

a particular first path pair of the plurality of first path pairs includes a particular first candidate path and a particular target edge between the first qubit and the second qubit that lies on the particular first candidate path; and the first score is weighted with respect to an order in which operations of the quantum circuit including the first qubit and the second qubit are performed with earlier operations being weighted more heavily than later operations; and selecting the first path pair that corresponds to a highest first score for routing the first node to the second node via the target edge.

8. The one or more non-transitory computer-readable storage media of claim 7, wherein the operations further comprise:

identifying a third node corresponding to a third qubit and a fourth node corresponding to a fourth qubit, the third qubit and the fourth qubit being configured to perform a second operation after a first operation performed by the first qubit and the second qubit;

generating a set of second candidate paths between the third node and the fourth node along one or more of the edges of the graph, each second candidate path in the set of second candidate paths specifying a path along which the third node and the fourth node move to arrive at a target edge between the third node and the fourth node;

computing second scores for a plurality of second path pairs, a respective second score indicating how efficiently each second path pair of the plurality of second path pairs routes the third node to the fourth node via the target edge; and selecting the second path pair that corresponds to a highest second score for routing the third node to the fourth node via the target edge.

9. The one or more non-transitory computer-readable storage media of claim 8, further comprising repeating the steps of the method of claim 8 until nodes associated with qubits used in a last operation of the quantum circuit have been routed.

10. The one or more non-transitory computer-readable storage media of claim 7, wherein generating a particular candidate path of the set of candidate paths comprises:

A) determining a first node location corresponding to the first node and a second node location corresponding to the second node;

B) identifying a fifth node that is directly connected to the first node, the fifth node having a fifth node location that is adjacent to the first node location;

C) determining whether the fifth node location is closer to the second node location than the first node location;

D) setting the first node location as the fifth node location responsive to determining that the fifth node location is closer to the second node location than the first node location; and iteratively repeating steps B), C), and D) until the first node location is adjacent to the second node location.

11. The one or more non-transitory computer-readable storage media of claim 7, wherein computing the first scores for the plurality of first pairs is based on an order in which the operations of the quantum circuit to which the first node and the second node relate are scheduled to be performed and a distance between the nodes involved in subsequent operations of the quantum circuit after routing the first node and the second node.

12. The one or more non-transitory computer-readable storage media of claim 11, wherein computing the first scores for the plurality of first pairs is represented as: $\delta_G(e,p)=S(g_i,e,p)+\Sigma_{gk\in G}\lambda^{w(gk)}\cdot d_{gi,e,p}(g_k)$ in which:

$\delta_G(e,p)$ represents a particular first score;

$S(g_i,e,p)$ represents a number of swap gates used to route the first node, $g_i$, to the second node, e, through a particular candidate path, p;

$\lambda^{w(gk)}$ represents a prioritization factor based on the order in which the operations of the quantum circuit are scheduled to be performed; and $d_{gi,e,p}(g_k)$ represents the distance between the nodes after routing the first node to the second node along the particular candidate path.

13. A system, comprising:

one or more processors; and one or more non-transitory computer-readable storage media configured to store instructions that, in response to being executed, cause the system to perform operations, the operations comprising:

obtaining a graph that includes a plurality of nodes and a plurality of edges in which a first node of the plurality of nodes represents a first qubit of a quantum circuit and a second node of the plurality of nodes represents a second qubit of the quantum circuit;

generating a set of first candidate paths between the first node and the second node along one or more edges of the plurality of edges, each first candidate path in the set of first candidate paths specifying a path along which the first node and the second node move to arrive adjacent to one another at a target edge that directly connects the first node and the second node;

computing first scores for a plurality of first path pairs, a respective first score indicating how efficiently each first path pair of the plurality of first path pairs routes the first node to the second node via the target edge, wherein:

a particular first path pair of the plurality of first path pairs includes a particular first candidate path and a particular target edge between the first qubit and the second qubit that lies on the particular first candidate path; and the first score is weighted with respect to an order in which operations of the quantum circuit including the first qubit and the second qubit are performed with earlier operations being weighted more heavily than later operations; and selecting the first path pair that corresponds to a highest first score for routing the first node to the second node via the target edge.

14. The system of claim 13, wherein the operations further comprise:

identifying a third node corresponding to a third qubit and a fourth node corresponding to a fourth qubit, the third qubit and the fourth qubit being configured to perform a second operation after a first operation performed by the first qubit and the second qubit;

generating a set of second candidate paths between the third node and the fourth node along one or more of the edges of the graph, each second candidate path in the set of second candidate paths specifying a path along which the third node and the fourth node move to arrive at a target edge between the third node and the fourth node;

computing second scores for a plurality of second path pairs, a respective second score indicating how efficiently each second path pair of the plurality of second path pairs routes the third node to the fourth node via the target edge; and selecting the second path pair that corresponds to a highest second score for routing the third node to the fourth node via the target edge.

15. The system of claim 14, further comprising repeating the steps of the method of claim 14 until nodes associated with qubits used in a last operation of the quantum circuit have been routed.

16. The system of claim 13, wherein generating a particular candidate path of the set of candidate paths comprises:

A) determining a first node location corresponding to the first node and a second node location corresponding to the second node;

B) identifying a fifth node that is directly connected to the first node, the fifth node having a fifth node location that is adjacent to the first node location;

C) determining whether the fifth node location is closer to the second node location than the first node location;

D) setting the first node location as the fifth node location responsive to determining that the fifth node location is closer to the second node location than the first node location; and iteratively repeating steps B), C), and D) until the first node location is adjacent to the second node location.

17. The system of claim 13, wherein computing the first scores for the plurality of first pairs is based on an order in which the operations of the quantum circuit to which the first node and the second node relate are scheduled to be performed and a distance between the nodes involved in subsequent operations of the quantum circuit after routing the first node and the second node.

18. The system of claim 17, wherein computing the first scores for the plurality of first pairs is represented as: $\delta_G(e,p)=S(g_i,e,p)+\Sigma_{gk\in G}\lambda^{w(gk)}\cdot d_{gi,e,p}(g_k)$ in which:

$\delta_G(e,p)$ represents a particular first score;

$S(g_i,e,p)$ represents a number of swap gates used to route the first node, $g_i$, to the second node, e, through a particular candidate path, p;

$\lambda^{w(gk)}$ represents a prioritization factor based on the order in which the operations of the quantum circuit are scheduled to be performed; and $d_{gi,e,p}(g_k)$ represents the distance between the nodes after routing the first node to the second node along the particular candidate path.

* * * * *